United States Patent
Wang et al.

(10) Patent No.: US 11,829,035 B2
(45) Date of Patent: Nov. 28, 2023

(54) DISPLAY APPARATUS AND METHOD OF OPERATING DISPLAY APPARATUS

(71) Applicants: BEIJING BOE DISPLAY TECHNOLOGY CO., LTD., Beijing (CN); BOE Technology Group Co., Ltd., Beijing (CN)

(72) Inventors: Feifei Wang, Beijing (CN); Xibin Shao, Beijing (CN); Hongming Zhan, Beijing (CN); Lintao Ji, Beijing (CN); Xiaochun Xu, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 410 days.

(21) Appl. No.: 16/977,402

(22) PCT Filed: Nov. 15, 2019

(86) PCT No.: PCT/CN2019/118873
§ 371 (c)(1),
(2) Date: Sep. 1, 2020

(87) PCT Pub. No.: WO2021/092924
PCT Pub. Date: May 20, 2021

(65) Prior Publication Data
US 2023/0147432 A1 May 11, 2023

(51) Int. Cl.
*G02F 1/13363* (2006.01)
*G02F 1/1334* (2006.01)
(Continued)

(52) U.S. Cl.
CPC ........ *G02F 1/13363* (2013.01); *G02F 1/1337* (2013.01); *G02F 1/13345* (2021.01);
(Continued)

(58) Field of Classification Search
None
See application file for complete search history.

(56) References Cited

U.S. PATENT DOCUMENTS

2003/0103182 A1* 6/2003 Mi ............... G02F 1/133632
349/130
2005/0140900 A1* 6/2005 Jeon ............ G02F 1/133634
349/117
(Continued)

FOREIGN PATENT DOCUMENTS

CN  101989013 A  3/2011
CN  102012587 A  4/2011
(Continued)

OTHER PUBLICATIONS

International Search Report & Written Opinion dated Aug. 24, 2020, regarding PCT/CN2019/118873.

*Primary Examiner* — Ryan Crockett
(74) *Attorney, Agent, or Firm* — Intellectual Valley Law, P.C.

(57) ABSTRACT

A display apparatus includes an array substrate; a counter substrate facing the array substrate; a liquid crystal layer between the array substrate and the counter substrate; at least one optical compensation film between the array substrate and the counter substrate, extending throughout a display area of the display apparatus; a control electrode between the array substrate and the counter substrate, extending throughout the display area of the display apparatus; and a back light configured to provide light for image display. The liquid crystal layer in a dark state has a first phase retardation. Under control of the control electrode, the at least one optical compensation film gives a second phase retardation when the liquid crystal layer is in the dark state. A sum of the first phase retardation and the second phase
(Continued)

retardation is substantially same as an integral multiple of a wavelength of light emitted from the back light.

17 Claims, 8 Drawing Sheets

(51) Int. Cl.
  *G02F 1/1335* (2006.01)
  *G02F 1/13357* (2006.01)
  *G02F 1/1337* (2006.01)
  *G02F 1/1343* (2006.01)

(52) U.S. Cl.
  CPC .. *G02F 1/133528* (2013.01); *G02F 1/133602* (2013.01); *G02F 1/134309* (2013.01)

(56) References Cited

U.S. PATENT DOCUMENTS

| | | | |
|---|---|---|---|
| 2006/0066785 A1* | 3/2006 | Moriya | G02F 1/13471 349/117 |
| 2006/0132687 A1 | 6/2006 | Chang et al. | |
| 2006/0285040 A1* | 12/2006 | Kobayashi | G02F 1/13471 349/117 |
| 2010/0208174 A1* | 8/2010 | Ong | G02F 1/13363 349/96 |
| 2012/0169987 A1 | 7/2012 | Li et al. | |
| 2014/0078445 A1 | 3/2014 | Wang et al. | |
| 2014/0157424 A1* | 6/2014 | Lee | G06F 21/74 726/26 |
| 2015/0277175 A1 | 10/2015 | Kang et al. | |
| 2015/0378199 A1 | 12/2015 | Kang et al. | |
| 2016/0026014 A1* | 1/2016 | Zhao | G02F 1/134363 349/33 |
| 2016/0342002 A1* | 11/2016 | Qin | G02F 1/133514 |
| 2018/0052344 A1* | 2/2018 | Suwa | G02F 1/134363 |
| 2018/0113334 A1* | 4/2018 | Fang | G02F 1/133528 |
| 2018/0224685 A1* | 8/2018 | Shao | G02F 1/13363 |
| 2019/0018272 A1* | 1/2019 | Zhao | G02B 27/286 |
| 2019/0219871 A1* | 7/2019 | Kawahira | G02F 1/133723 |
| 2019/0353944 A1* | 11/2019 | Acreman | G02F 1/134309 |
| 2020/0096803 A1* | 3/2020 | Saitoh | G02F 1/133528 |
| 2020/0249504 A1* | 8/2020 | Hopkin | G09G 3/3426 |
| 2020/0285108 A1* | 9/2020 | Saitoh | G02F 1/13 |
| 2020/0371399 A1* | 11/2020 | Liu | G02F 1/13394 |
| 2021/0033898 A1* | 2/2021 | Woodgate | G02F 1/133567 |
| 2021/0199879 A1* | 7/2021 | Robinson | G02F 1/133536 |
| 2021/0263352 A1* | 8/2021 | Chen | G02F 1/137 |

FOREIGN PATENT DOCUMENTS

| | | |
|---|---|---|
| CN | 102540542 A | 7/2012 |
| CN | 102830527 A | 12/2012 |
| CN | 102830547 A | 12/2012 |
| CN | 103439829 A | 12/2013 |
| CN | 104062808 A | 9/2014 |
| CN | 108089377 A | 5/2018 |
| CN | 110187527 A | 8/2019 |
| KR | 20140106936 A | 9/2014 |

\* cited by examiner

DISPLAY APPARATUS AND METHOD OF OPERATING DISPLAY APPARATUS

CROSS-REFERENCE TO RELATED APPLICATION

This application is a national stage application under 35 U.S.C. § 371 of International Application No. PCT/CN2019/118873, filed Nov. 15, 2019, the contents of which are incorporated by reference in the entirety.

TECHNICAL FIELD

The present invention relates to display technology, more particularly, to a display apparatus and a method of operating a display apparatus.

BACKGROUND

In a fringe field driven liquid crystal display panel, the liquid crystal layer is driven by a fringe electric field. Examples of fringe field driven liquid crystal display panel include an advanced super-dimensional switching (ADS) liquid crystal display panel, an in-plane switching (IPS) liquid crystal display panel, and a fringe field switching (FFS) liquid crystal display panel. In a fringe field driven liquid crystal display panel, liquid crystal molecules have a substantially parallel and uniform orientation relative to a substrate in a non-driven state. In the non-driven state, an oscillation direction of light substantially does not change as the light passes through the liquid crystal layer. When the polarization directions of two polarizers disposed on outer surfaces of two substrates are substantially perpendicular to each other, the fringe field driven liquid crystal display panel is in a normally dark state.

SUMMARY

In one aspect, the present invention provides a display apparatus, comprising an array substrate; a counter substrate facing the array substrate; a liquid crystal layer between the array substrate and the counter substrate; at least one optical compensation film between the array substrate and the counter substrate, extending throughout a display area of the display apparatus; a control electrode between the array substrate and the counter substrate, extending throughout the display area of the display apparatus; and a back light configured to provide light for image display; wherein the liquid crystal layer in a dark state has a first phase retardation, which is a product of a refractive index of the liquid crystal layer and a cell gap corresponding to a thickness of the liquid crystal layer along a direction from the array substrate to the counter substrate; under control of the control electrode, the at least one optical compensation film gives a second phase retardation when the liquid crystal layer is in the dark state; and a sum of the first phase retardation and the second phase retardation is substantially same as an integral multiple of a wavelength of light emitted from the back light, thereby reducing dark state light leakage of the display apparatus; wherein, under control of the control electrode, the at least one optical compensation film is configured to reduce a contrast ratio and transmittance of the display apparatus in an image display mode, thereby achieving a reduced viewing angle.

Optionally, the sum of the first phase retardation and the second phase retardation is substantially zero.

Optionally, the display apparatus further comprises a first alignment film between the liquid crystal layer and the array substrate and a second alignment film between the liquid crystal layer and the counter substrate, for aligning liquid crystal molecules in the liquid crystal layer; wherein the control electrode is a unitary layer between the counter substrate and the second alignment film.

Optionally, the display apparatus further comprises a reference electrode configured to provide a low voltage as a reference voltage for the control electrode.

Optionally, a respective one of a plurality of subpixels of the display apparatus comprises a pixel electrode and a common electrode for applying an electric field for driving the liquid crystal layer; wherein the common electrode functions as the reference electrode.

Optionally, the array substrate comprises a first glass layer subject to a first stress and having a third phase retardation; the counter substrate comprises a second glass layer subject to a second stress and having a fourth phase retardation; and a sum of the first phase retardation, the second phase retardation, the third phase retardation, and the fourth phase retardation is substantially zero.

Optionally, the display apparatus further comprises a first polarization plate and a second polarization plate; wherein the first glass layer is between the first polarization plate and the liquid crystal layer; and the second glass layer is between the second polarization plate and the liquid crystal layer.

Optionally, the control electrode comprises a plurality of control electrode blocks respectively in a plurality of subpixels of the display apparatus; and the plurality of control electrode blocks are independently addressable.

Optionally, the at least one optical compensation film is between the control electrode and the second alignment film.

Optionally, the at least one optical compensation film is between the array substrate and the first alignment film.

Optionally, the at least one optical compensation film comprises a first optical compensation film between the control electrode and the second alignment film, and a second optical compensation film between the array substrate and the first alignment film.

Optionally, the at least one optical compensation film comprises a plurality of liquid crystal droplets dispersed in a polymer material; sizes of the plurality of liquid crystal droplets have a gradient distribution along a first direction from the array substrate to the counter substrate or along a second direction from the counter substrate to the array substrate.

Optionally, the polymer material comprises a first polymer and a second polymer; contents of the first polymer has a gradient distribution such that the content of the first polymer increases along one of the first direction and the second direction, and decreases along another of the first direction and the second direction; contents of the second polymer has a gradient distribution such that the content of the second polymer increases along the another of the first direction and the second direction, and decreases along the one of the first direction and the second direction; and the sizes of the plurality of liquid crystal droplets increases along the one of the first direction and the second direction, and decreases along the another of the first direction and the second direction.

In another aspect, the present invention provides a method of operating a display apparatus, wherein the display apparatus comprises an array substrate; a counter substrate facing the array substrate; a liquid crystal layer between the array substrate and the counter substrate; at least one optical compensation film between the array substrate and the counter substrate, extending throughout a display area of the display apparatus; a control electrode between the array substrate and the counter substrate, extending throughout the display area of the display apparatus; and a back light configured to provide light for image display; wherein the liquid crystal layer in a dark state has a first phase retardation, which is a product of a refractive index of the liquid crystal layer and a cell gap corresponding to a thickness of the liquid crystal layer along a direction from the array substrate to the counter substrate; wherein the method comprises when the liquid crystal layer is in the dark state, applying a first voltage to the control electrode to control the at least one optical compensation film to give a second phase retardation, such that a sum of the first phase retardation and the second phase retardation is substantially same as an integral multiple of a wavelength of light emitted from the back light, thereby reducing dark state light leakage of the display apparatus; and when the display apparatus is in an image display mode, applying a second voltage to the control electrode to control the at least one optical compensation film to reduce a contrast ratio and transmittance of the display apparatus in the image display mode, thereby achieving a reduced viewing angle.

Optionally, the sum of the first phase retardation and the second phase retardation is substantially zero.

Optionally, the display apparatus further comprises a reference electrode; wherein the method further comprises applying a low voltage to the reference electrode as a reference voltage for the control electrode.

Optionally, a respective one of a plurality of subpixels of the display apparatus comprises a pixel electrode and a common electrode for applying an electric field for driving the liquid crystal layer; wherein applying the low voltage to the reference electrode comprises applying a common voltage to the common electrode.

Optionally, the array substrate comprises a first glass layer subject to a first stress and having a third phase retardation; the counter substrate comprises a second glass layer subject to a second stress and having a fourth phase retardation; and a sum of the first phase retardation, the second phase retardation, the third phase retardation, and the fourth phase retardation is substantially zero.

In another aspect, the present invention provides a. method of fabricating a display apparatus, comprising forming an array substrate; forming a counter substrate; assembling the array substrate and the counter substrate into a cell; forming a liquid crystal layer in the cell between the array substrate and the counter substrate; forming at least one optical compensation film, the at least one optical compensation film formed between the array substrate and the counter substrate, extending throughout a display area of the display apparatus; forming a control electrode, the control electrode formed between the array substrate and the counter substrate, and extending throughout the display area of the display apparatus; and forming a back light configured to provide light for image display; wherein the liquid crystal layer in a dark state has a first phase retardation, which is a product of a refractive index of the liquid crystal layer and a cell gap corresponding to a thickness of the liquid crystal layer along a direction from the array substrate to the counter substrate; under control of the control electrode, the at least one optical compensation film gives a second phase retardation when the liquid crystal layer is in the dark state; and a sum of the first phase retardation and the second phase retardation is substantially same as an integral multiple of a wavelength of light emitted from the back light, thereby reducing dark state light leakage of the display apparatus; wherein, under control of the control electrode, the at least one optical compensation film is configured to reduce a contrast ratio and transmittance of the display apparatus in an image display mode, thereby achieving a reduced viewing angle.

Optionally, forming the at least one optical compensation film comprises forming a mixture comprising a liquid crystal molecule, a first monomer, and a second monomer; and irradiating the mixture to polymerize the first monomer into a first polymer and polymerize the second monomer into a second polymer, so that the at least one optical compensation film comprises a plurality of liquid crystal droplets dispersed in a polymer material; wherein the polymer material comprises the first polymer and the second polymer; sizes of the plurality of liquid crystal droplets have a gradient distribution along a first direction from the array substrate to the counter substrate or along a second direction from the counter substrate to the array substrate; contents of the first polymer has a gradient distribution such that the content of the first polymer increases along one of the first direction and the second direction, and decreases along another of the first direction and the second direction; contents of the second polymer has a gradient distribution such that the content of the second polymer increases along the another of the first direction and the second direction, and decreases along the one of the first direction and the second direction; and the sizes of the plurality of liquid crystal droplets increases along the one of the first direction and the second direction, and decreases along the another of the first direction and the second direction.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional fringe field driven liquid crystal display panels such as a liquid crystal display panel operated in an Advanced Super Dimension Switch mode, darkness non-uniformity (DNU) and edge-side mura occur due to light leakage issues. For example, in a dark state, light leakage occurs in a fringe field driven liquid crystal display panel. Moreover, when a user touches the conventional liquid crystal display panel, light leakage occurs at and around the touching area. Display quality of the liquid crystal display panel is severely affected.

Figure 1:
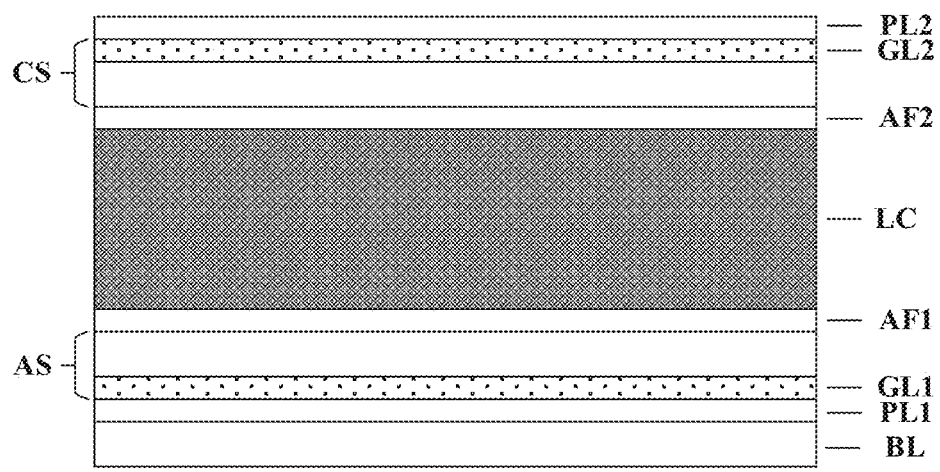
FIG. 1 is a schematic diagram illustrating a structure of a display apparatus in some embodiments according to the present disclosure.

FIG. 1 is a schematic diagram illustrating the structure, of a display apparatus in some embodiments according to the present disclosure. Referring to FIG. 1, the display apparatus includes an array substrate AS; a counter substrate CS facing the array substrate AS; a liquid crystal layer LC between the array substrate AS and the counter substrate CS; a first polarization plate PL1 on a side of the array substrate AS away from the liquid crystal layer LC; a second polarization plate PL2 on a side of the counter substrate CS away from the liquid crystal layer LC; a first alignment film AF1 between the liquid crystal layer LC and the array substrate AS and a second alignment film AF2 between the liquid crystal layer LC and the counter substrate CS, for aligning liquid crystal molecules in the liquid crystal layer LC; and a back light BL configured to provide light for image display. The array substrate AS includes a first glass layer GL1, the counter substrate CS includes a second glass layer GL2.

Figure 2:
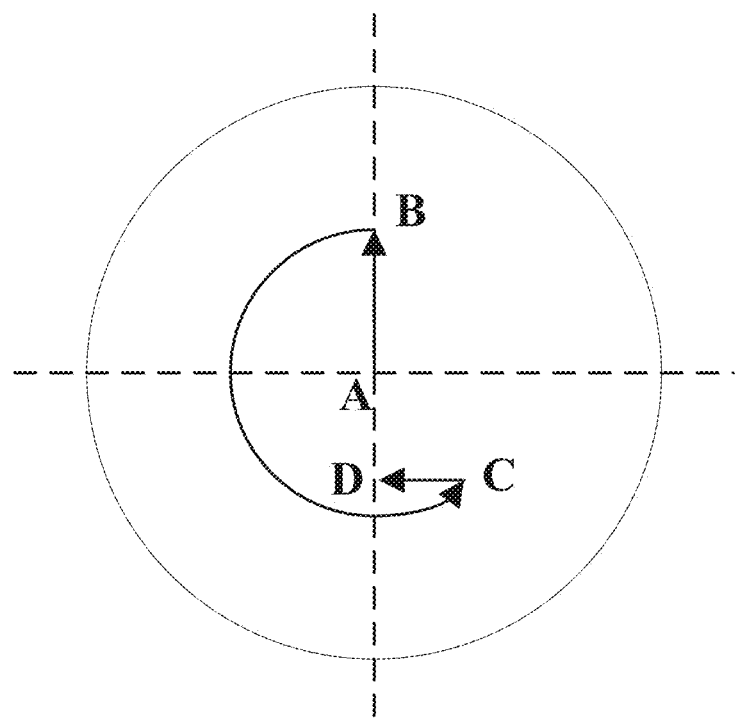
FIG. 2 is a schematic diagram illustrating polarization state change in a display apparatus in a dark state in some embodiments according to the present disclosure.

In some embodiments, when the first glass layer GL1 and the second glass layer GL2 are subject to stress (e.g., tensile stress), the first glass layer GL1 and the second glass layer GL2 have phase retardation. FIG. 2 is a schematic diagram illustrating polarization state change in a display apparatus in a dark state in some embodiments according to the present disclosure. Referring to FIG. 2 and FIG. 1, light emitted from the back light BL transmits through the first polarization plate PL1, and is converted into a linear polarization light (indicated by point A in FIG. 2). Due to the existence of stress in the first glass layer GL1, the polarization state of the linear polarization light undergoes a change when it transmits through the first glass layer GL1, and in converted into an elliptical polarization light (indicated by point B in FIG. 2). A polarization direction of the elliptical polarization light is not parallel to the transmission axis of the liquid crystal layer LC, thus the elliptical polarization light is modulated by the liquid crystal layer LC. The polarization state of the light changes again when it transmits through the liquid crystal layer LC (indicated by point C in FIG. 2). Due to the existence of stress in the second glass layer GL2, the polarization state of the polarization light again undergoes a change when it transmits through the second glass layer GL2 (indicated by point D in FIG. 2). As shown in FIG. 2, point D is offset from point A, resulting in light leakage.

Accordingly, the present disclosure provides, inter alia, a display apparatus and a method of operating a display apparatus that substantially obviate one or more of the problems due to limitations and disadvantages of the related art. In one aspect, the display apparatus includes an array substrate; a counter substrate; a liquid crystal layer between the array substrate and the counter substrate; at least one optical compensation film between the array substrate and the counter substrate, extending throughout a display area of the display apparatus; a control electrode between the array substrate and the counter substrate, extending throughout the display area of the display apparatus; and a back light configured to provide light for image display. Optionally, the liquid crystal layer in a dark state has a first phase retardation, which is a product of a refractive index of the liquid crystal layer and a cell gap corresponding to a thickness of the liquid crystal layer along a direction from the array substrate to the counter substrate. Optionally, under control of the control electrode, the at least one optical compensation film gives a second phase retardation when the liquid crystal layer is in the dark state. Optionally, a sum of the first phase retardation and the second phase retardation is substantially same as an integral multiple of a wavelength of light emitted from the back light, thereby reducing dark state light leakage of the display apparatus. Optionally, under control of the control electrode, the at least one optical compensation film is configured to reduce a contrast ratio and transmittance of the display apparatus in an image display mode, thereby achieving a reduced viewing angle. Optionally, the sum of the first phase retardation and the second phase retardation is substantially zero.

As used herein, the term "substantially the same" refers to a difference between two values not exceeding 10% of a base value (e.g., either one of the first phase retardation and the second phase retardation), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value. As used herein, the term "substantially zero" refers to that the first phase retardation and the second phase retardation cancel out each other with no residual phase retardation or only a residual phase retardation remaining, wherein the residual phase retardation does not exceed 10% of a base value (e.g., either one of the first phase retardation and the second phase retardation), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

Figure 3:
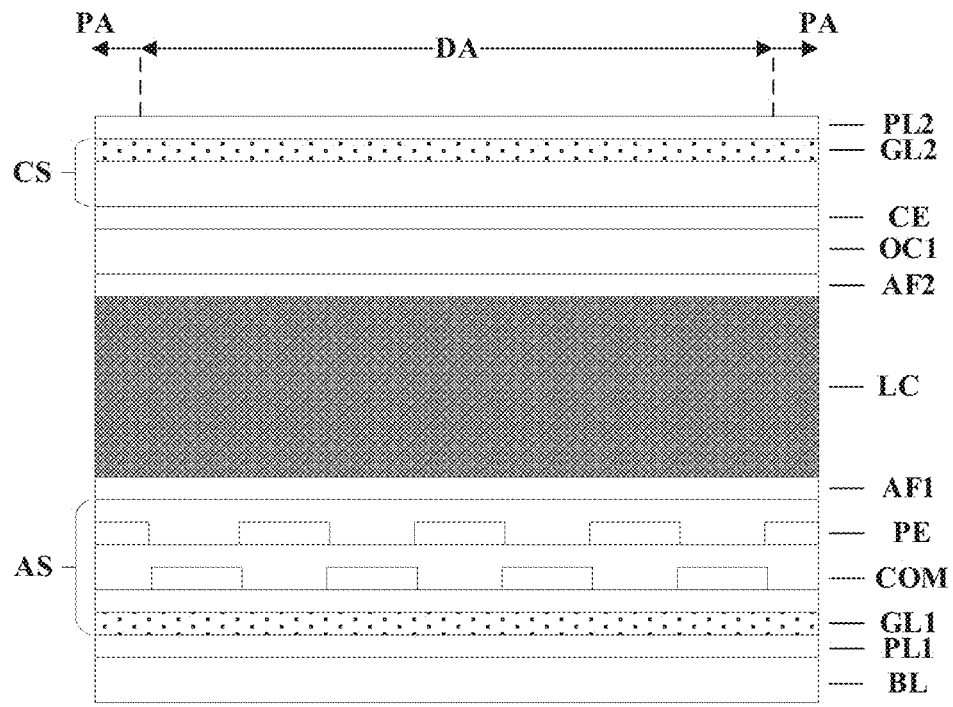
FIG. 3 is a schematic diagram illustrating a structure of a display apparatus in some embodiments according to the present disclosure.

FIG. 3 is a schematic diagram illustrating a structure of a display apparatus in some embodiments according to the present disclosure. Referring to FIG. 3, the display apparatus includes an array substrate AS; a counter substrate CS facing the array substrate AS; a liquid crystal layer LC between the array substrate AS and the counter substrate CS; at least one optical compensation film (e.g., a first optical compensation film OC1) between the array substrate AS and the counter substrate CS, extending throughout a display area DA of the display apparatus; a control electrode CE between the array substrate AS and the counter substrate CS, extending throughout the display area DA of the display apparatus; and a back light BL configured to provide light for image display. The display apparatus has a display area DA in which a plurality of subpixels of the display apparatus are disposed, and a peripheral area PA. As used herein, the term "display area" refers to an area of a display apparatus where image is actually displayed. Optionally, the display area may include both a subpixel region and an inter-subpixel region. A subpixel region refers to a light emission region of a subpixel, such as a region corresponding to a pixel electrode in a liquid crystal display panel or a region corresponding to a light emissive layer in an organic light emitting diode display panel. An inter-subpixel region refers to a region between adjacent subpixel regions, such as a region corresponding to a black matrix in a liquid crystal display panel or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. As used herein the term "peripheral area" refers to an area of a display apparatus where various circuits and wires are provided to transmit signals to the display apparatus. To increase the transparency of the display apparatus, non-transparent or opaque components of the display apparatus (e.g., battery, printed circuit board, metal frame), can be disposed in the peripheral area rather than in the display areas.

Figure 4:
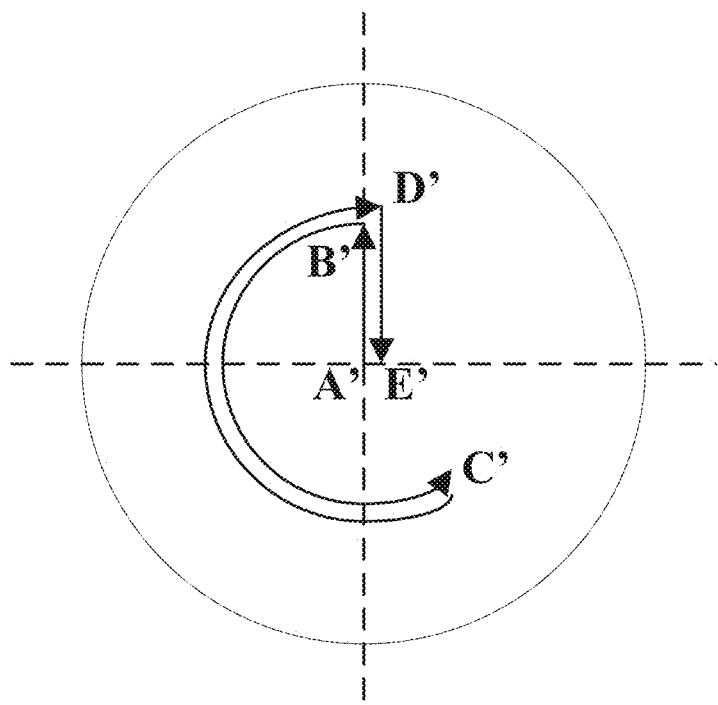
FIG. 4 is a schematic diagram illustrating polarization state change in a display apparatus in a dark state in some embodiments according to the present disclosure.

FIG. 4 is a schematic diagram illustrating polarization state change in a display apparatus in a dark state in some embodiments according to the present disclosure. Referring to FIG. 4 and FIG. 3. light emitted from the back light BL transmits through the first polarization plate PL1, and is converted into a linear polarization light (indicated by point A' in FIG. 4). Due to the existence of stress in the first glass layer GL1, the polarization state of the linear polarization light undergoes a change when it transmits through the first glass layer GL1, and is converted into an elliptical polarization light (indicated by point B' in FIG. 4). A polarization direction of the elliptical polarization light is not parallel to the transmission axis of the liquid crystal layer LC, thus the elliptical polarization light is modulated by the liquid crystal layer LC. The polarization state of the light changes again when it transmits through the liquid crystal layer LC (indicated by point C' in FIG. 4).

In the dark state, the liquid crystal layer has a first phase retardation, which is a product of a refractive index of the liquid crystal layer and a cell gap corresponding to a thickness of the liquid crystal layer along a direction from the array substrate AS to the counter substrate CS. Under control of the control electrode CE, the at least one optical compensation film (e.g., a first optical compensation film OC1) gives a second phase retardation when the liquid crystal layer is in the dark state. The control electrode CE controls the at least one optical compensation film so that a sum of the first phase retardation and the second phase retardation is substantially same as an integral multiple of a wavelength of light emitted from the back light BL. Optionally, the integral multiple is, e.g., 0, 1, 2, 3, 4, or 5. In one example, the control electrode CE controls the at least one optical compensation film so that the sum of the first phase retardation and the second phase retardation is substantially zero.

Referring to FIG. 4 and FIG. 3 again, the light transmitted out of the liquid crystal layer LC (indicated by point C' in FIG. 4), and is modulated by the at least one optical compensation film. The polarization state of the light changes again when it transmits through the at least one optical compensation film (indicated by point D' in FIG. 4). Due to the existence of stress in the second glass layer GL2, the polarization state of the polarization light again undergoes a change when it transmits through the second glass layer GL2 (indicated by point E' in FIG. 4). As shown in FIG. 4, point E' substantially overlaps with point A'. Comparing FIG. 4 and FIG. 2, the at least one optical compensation film in the present display apparatus reduces dark state light leakage of the display apparatus.

Figure 5B:
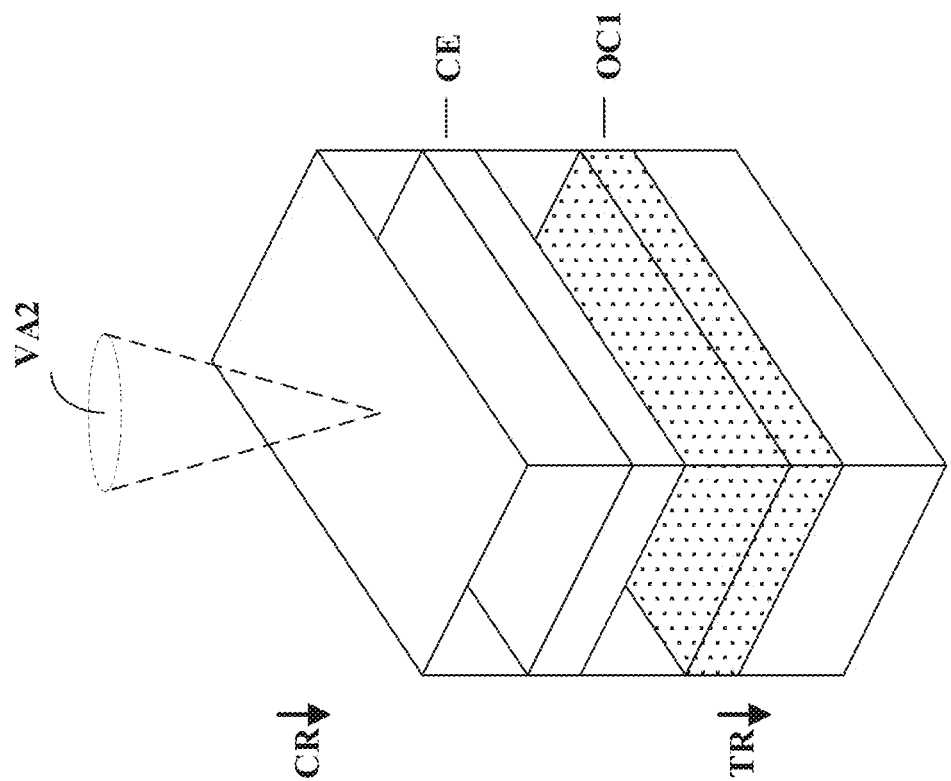
FIG. 5A and FIG. 5B illustrate adjustment of viewing angles in an image display mode of a display apparatus in some embodiments according to the present disclosure.
Figure 5A:
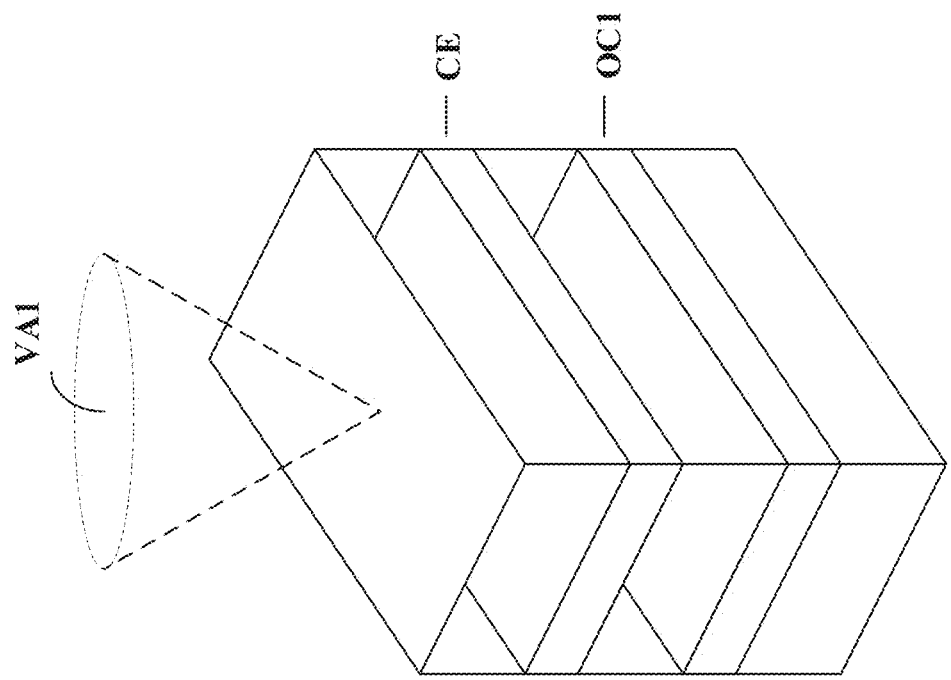

In some embodiments, under control of the control electrode, the at least one optical compensation film is configured to reduce a contrast ratio and transmittance of the display apparatus in an image display mode, thereby achieving a reduced viewing angle. As used herein, the term "viewing angle" of a display apparatus refers to a cone region in which a contrast ratio of the image display in the display apparatus equals to or greater than 10. The contrast ratio generally refers to a ratio of a maximum brightness value divided by a minimum brightness value. Transmittance of the display apparatus also affects the viewing angle. The transmittance generally refers to a ratio of the brightness of the light passing through the display apparatus to the brightness of the light prior to passing through the display apparatus. FIG. 5A and FIG. 5B illustrate adjustment of viewing angles in an image display mode of a display apparatus in some embodiments according to the present disclosure. Referring to FIG. 5A, in the image display mode, the display apparatus has a first viewing angle VA1 when the at least one optical compensation film (e.g., a first optical compensation film OC1) is not under control of the control electrode CE. Referring to FIG. 5B, a voltage is applied to the control electrode CE. Under control of the control electrode CE, the first optical compensation film OC1 undergoes a change in transmittance TR. The transmittance TR of the first optical compensation film OC1 decreases, resulting in a reduced contrast ratio CR of the display apparatus. The display apparatus as shown in FIG. 5B has a second viewing angle VA2, which is smaller than the first viewing angle VA1. Accordingly, in the image display mode, the at least one optical compensation film and the control electrode CE in the present display apparatus may adjust the viewing angle of the display apparatus to achieve a privacy mode in the display apparatus.

Referring to FIG. 3, the display apparatus in some embodiments further includes a first alignment film AF1 between the liquid crystal layer LC and the array substrate AS and a second alignment film AF2 between the liquid crystal layer LC and the counter substrate CS, for aligning liquid crystal molecules in the liquid crystal layer LC. Optionally, the control electrode CE is a unitary layer between the counter substrate CS and the second alignment film AF2. As shown in FIG. 3, in some embodiments, the at least one optical compensation film (e.g., a first optical compensation film OC1) is between the control electrode CE and the second alignment film AF2.

Figure 6:
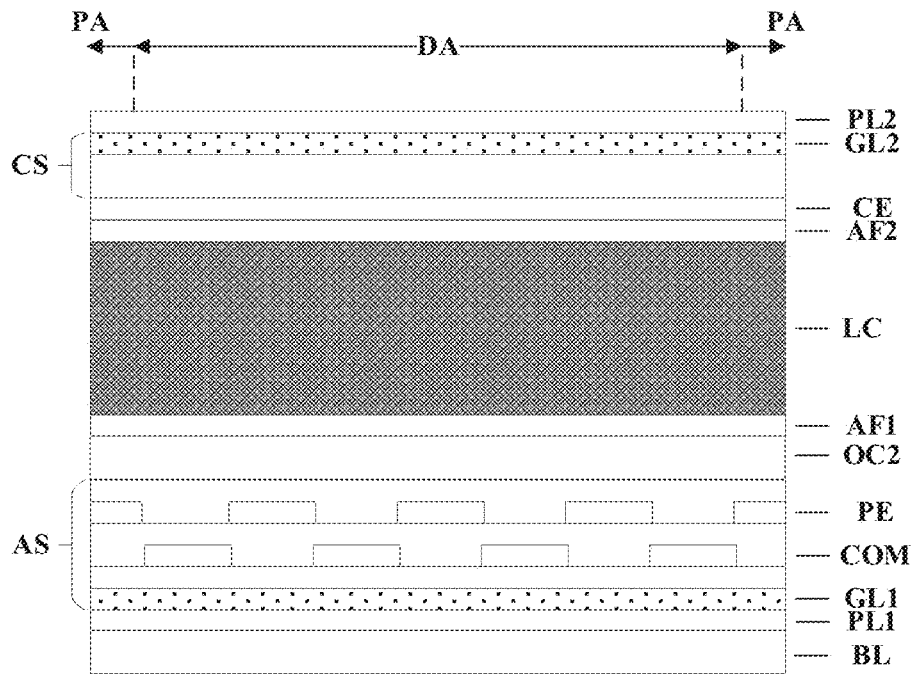
FIG. 6 is a schematic diagram illustrating a structure of a display apparatus in some embodiments according to the present disclosure.

FIG. 6 is a schematic diagram illustrating a structure of a display apparatus in some embodiments according to the present disclosure. Referring to FIG. 6, in some embodiments, the at least one optical compensation film (e.g., a second optical compensation film OC2) is between the array substrate AS and the first alignment film AF1.

Figure 7:
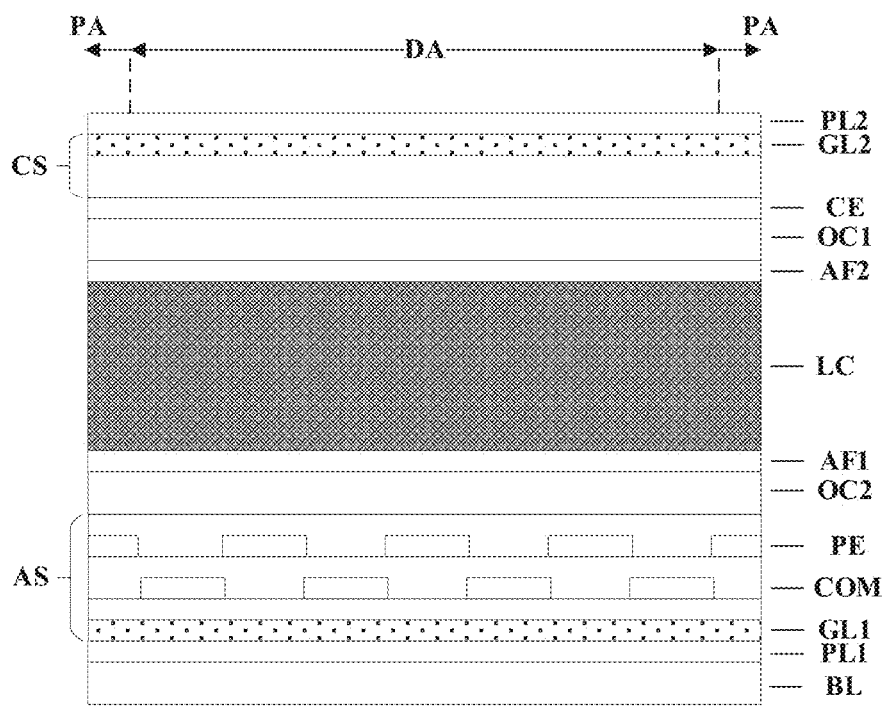
FIG. 7 is a schematic diagram illustrating a structure of a display apparatus in some embodiments according to the present disclosure.

FIG. 7 is a schematic diagram illustrating a structure of a display apparatus in some embodiments according to the present disclosure. Referring to FIG. 7, in some embodiments, the at least one optical compensation film comprises a first optical compensation film OC1 between the control electrode CE and the second alignment film AF2, and a second optical compensation film OC2 between the array substrate AS and the first alignment film AF1.

Figure 8:
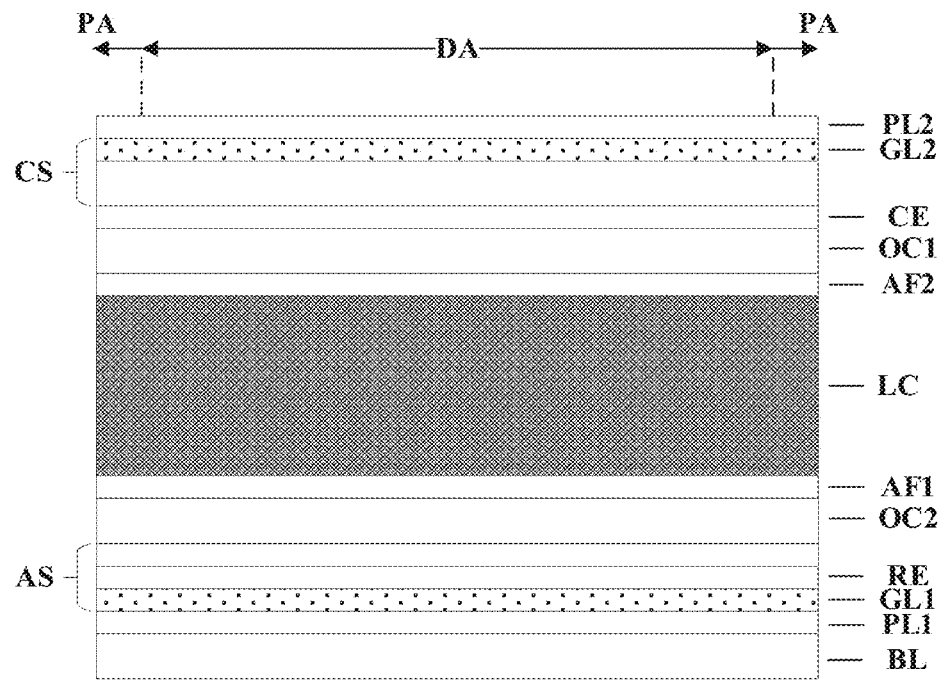
FIG. 8 is a schematic diagram illustrating a structure of a display apparatus in some embodiments according to the present disclosure.

FIG. 8 is a schematic diagram illustrating the structure of a display apparatus in some embodiments according to the present disclosure. Referring to FIG. 8, the display apparatus in some embodiments further includes a reference electrode RE configured to provide a low voltage as a reference voltage for the control electrode CE. Optionally, the reference electrode RE is on a side of the first alignment film AF1 away from the liquid crystal layer LC. Optionally, as shown in FIG. 8, the reference electrode RE is disposed in the array substrate AS. The control electrode CE and the reference electrode RE form an electrical field configured to adjust the phase retardation of the at least one optical compensation film when the display apparatus is in a dark state, and form an electrical field configured to adjust the transmittance of the at least one optical compensation film to reduce the contrast ratio and the viewing angle of the display apparatus.

In some embodiments, a respective one of a plurality of subpixels of the display apparatus includes a pixel electrode and a common electrode for applying an electric field for driving the liquid crystal layer. Optionally, the common electrode functions as the reference electrode for providing a low voltage as the reference voltage for the control electrode. Referring to FIG. 3, FIG. 6, and FIG. 7, the display apparatus includes a common electrode COM and a pixel electrode PE. A common voltage is provided to the common electrode COM. When the liquid crystal layer LC is in the dark state, a first voltage is applied to the control electrode CE, and a common voltage is applied to the common electrode COM. A first electrical field is formed between the control electrode CE and the common electrode COM, controlling the at least one optical compensation film to give a second phase retardation, such that a sum of the first phase retardation and the second phase retardation is substantially same as an integral multiple of a wavelength of light emitted from the back light, thereby reducing dark state light leakage of the display apparatus. When the display apparatus is in an image display mode, a second voltage is applied to the control electrode CE, and a common voltage is applied to the common electrode COM. A second electrical field is formed between the control electrode CE and the common electrode COM, controlling the at least one optical compensation film to reduce a contrast ratio and transmittance of the display apparatus in the image display mode, thereby achieving a reduced viewing angle. Referring to FIG. 7, both the first optical compensation film OC1 and the second optical compensation film OC2 are controlled by the electrical field formed between the control electrode CE and the common electrode COM.

Referring to FIGS. 3, 6-8, the array substrate AS includes a first glass layer GL1 that is subject to a first stress and having a third phase retardation; and the counter substrate CS includes a second glass layer GL2 that is subject to a second stress and having a fourth phase retardation. For example, one of the underlying reasons for the dark state light leakage (as well as color shift, mura, and darkness non-uniformity) is a stress-induced birefringence in the first glass layer GL1 and the second glass layer GL2. Under the stress, the first glass layer GL1 and the second glass layer GL2 become birefringent, and the optical axes of the first glass layer GL1 and the second glass layer GL2 are often non-parallel to each other, resulting in light leakage, as illustrated in FIG. 2. In some embodiments, by having the at least one optical compensation film under the control of the control electrode, the second phase retardation can be modulated so that a sum of the first phase retardation, the second phase retardation, the third phase retardation, and the fourth phase retardation is substantially zero, as illustrated in FIG. 4 (point E' and point A' substantially overlapping with each other).

In some embodiments, the display apparatus further includes a first polarization plate PL1 and a second polarization plate PL2. Optionally, the first glass layer GL1 is between the first polarization plate PL1 and the liquid crystal layer LS. Optionally, the second glass layer GL2 is between the second polarization plate PL2 and the liquid crystal layer LC. Optionally, the first polarization plate PL1 has a first polarization direction, and the second polarization plate PL2 has a second polarization direction. Optionally, the second polarization direction is substantially orthogonal to the first polarization direction.

Figure 9:
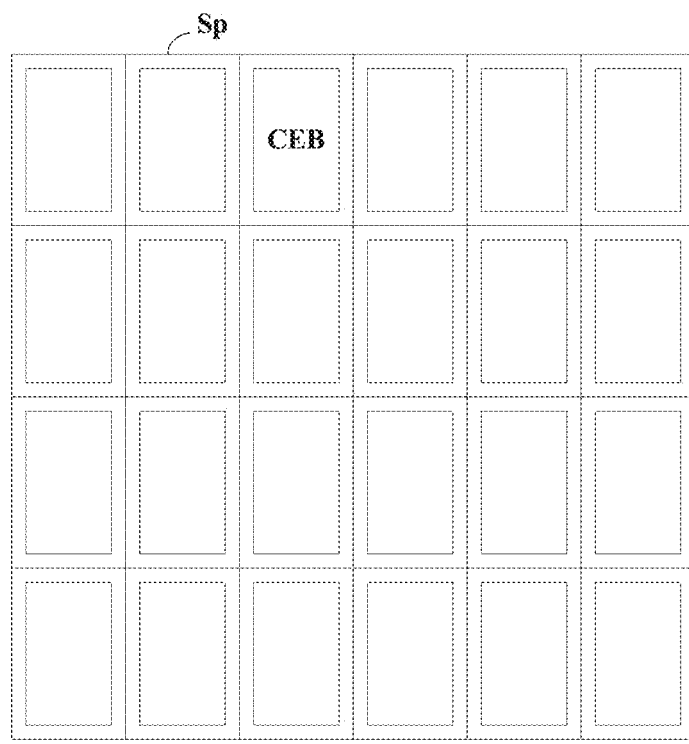
FIG. 9 is a schematic diagram illustrating a structure of a control electrode in a display apparatus in some embodiments according to the present disclosure.
Figure 10:
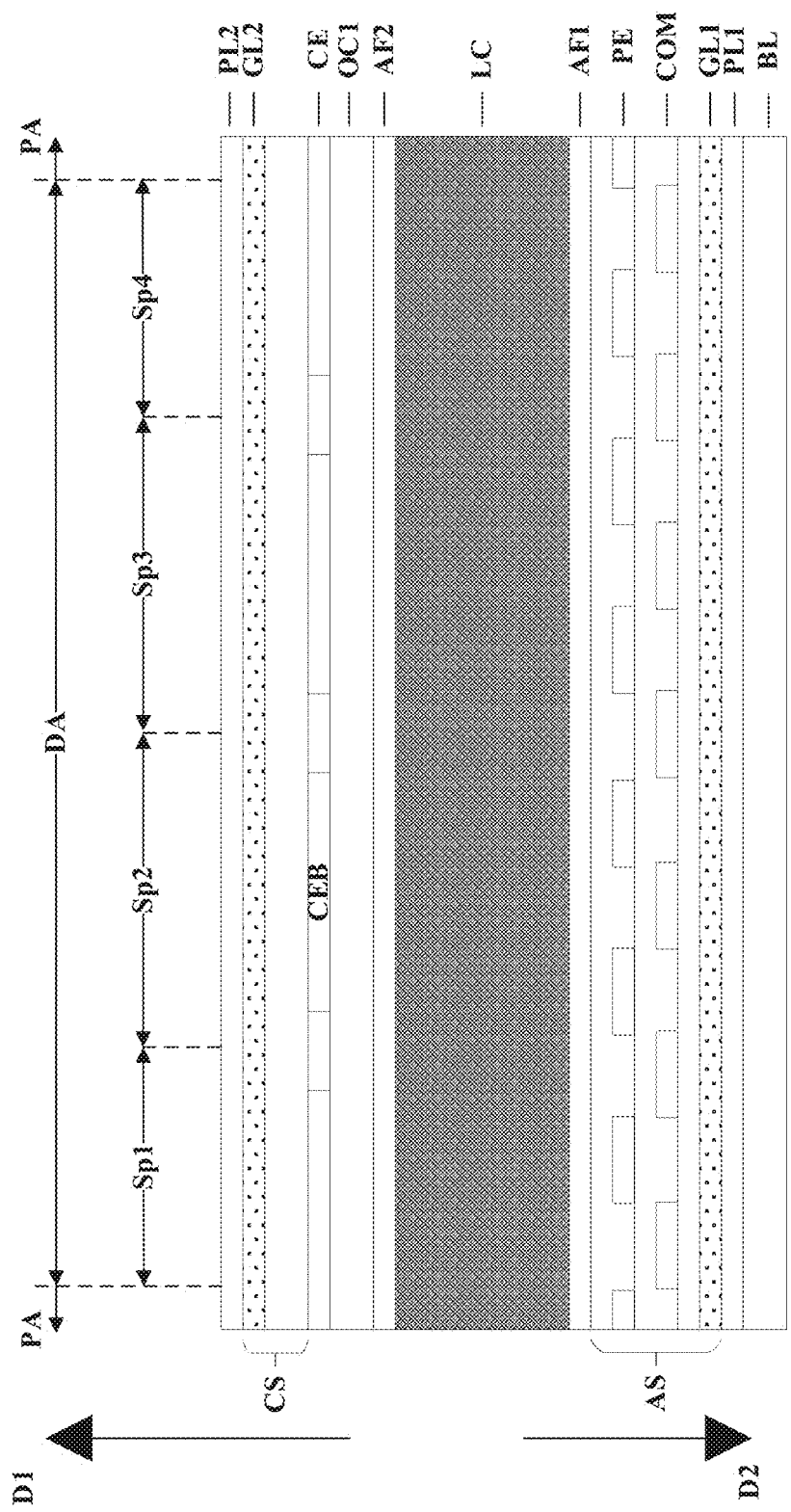
FIG. 10 is a schematic diagram illustrating a structure of a display apparatus in some embodiments according to the present disclosure.

FIG. 9 is a schematic diagram illustrating the structure of a control electrode in a display apparatus in some embodiments according to the present disclosure. Referring to FIG. 9, in some embodiments, the control electrode includes a plurality of control electrode blocks CEB respectively in a plurality of subpixels Sp of the display apparatus. The plurality of control electrode blocks CEB are independently addressable. FIG. 10 is a schematic diagram illustrating the structure of a display apparatus in some embodiments according to the present disclosure. Referring to FIG. 10, four subpixels of the plurality of subpixels are shown, including a first subpixel Sp1, a second subpixel Sp2, a third subpixel Sp3, and a fourth subpixel Sp4. Four control electrode blocks of the plurality of control electrode blocks CEB respectively in the four subpixels are independently addressable. For example, each of the plurality of control electrode blocks CEB are connected to a respective signal line for applying a voltage signal. The plurality of control electrode blocks CEB can be applied with different voltage signals, respectively.

In some embodiments, one of the plurality of subpixels is in the dark state while another one of the plurality of subpixels is in the image display mode. For example, referring to FIG. 10, the first subpixel Sp1 is in the dark state, and the fourth subpixel Sp4 is in the image display mode. Because the plurality of control electrode blocks CEB are independently addressable, a respective one of the plurality of control electrode blocks CEB in the first subpixel Sp1 and a respective one of the plurality of control electrode blocks CEB in the fourth subpixel Sp4 can be independently provided with two independent voltage signals. For example, a first voltage signal may be applied to the respective one of the plurality of control electrode blocks CEB in the first subpixel Sp1, while a second voltage signal may be applied to the respective one of the plurality of control electrode blocks CEB in the fourth subpixel Sp4. Under control of the respective one of the plurality of control electrode blocks CEB in the first subpixel Sp1, a portion of the first optical compensation film OC1 in the first subpixel Sp1 gives a second phase retardation. A portion of the liquid crystal layer in the first subpixel Sp1 has a first phase retardation, a sum of the first phase retardation and the second phase retardation is substantially same as an integral multiple of a wavelength of light emitted from the back light, thereby reducing dark state light leakage in the first subpixel Sp1 of the display apparatus. Under control of the respective one of the plurality of control electrode blocks CEB in the fourth subpixel Sp4, transmittance of a portion of the first optical compensation film OC1 in the fourth subpixel Sp4 is reduced, thereby reducing viewing angle in a region corresponding to the fourth subpixel Sp4.

In some embodiments, the display apparatus includes a plurality of regions, each of which includes at least two subpixels of the plurality of subpixels. In some embodiments, a first region of the plurality of regions is in the dark state (e.g., grayscale=0) while a second region of the plurality of regions is in the image display mode (e.g., average grayscale>0). Because the plurality of control electrode blocks CEB are independently addressable, at least two control electrode blocks of the plurality of control electrode blocks CEB in the first region may be applied with a first voltage signal, and at least two control electrode blocks of the plurality of control electrode blocks CEB in the second region may be applied with a second voltage signal. Under control of the at least two control electrode blocks of the plurality of control electrode blocks CEB in the first region, a portion of the first optical compensation film OC1 in the first region gives a second phase retardation. A portion of the liquid crystal layer in the first region has a first phase retardation, a sum of the first phase retardation and the second phase retardation is substantially same as an integral multiple of a wavelength of light emitted from the backlight, thereby reducing dark state light leakage in the first region of the display apparatus. Under control of the at least two control electrode blocks of the plurality of control electrode blocks CEB in the second region, transmittance of a portion of the first optical compensation film OC1 in the second region is reduced, thereby reducing viewing angle in the second region.

Figure 11:
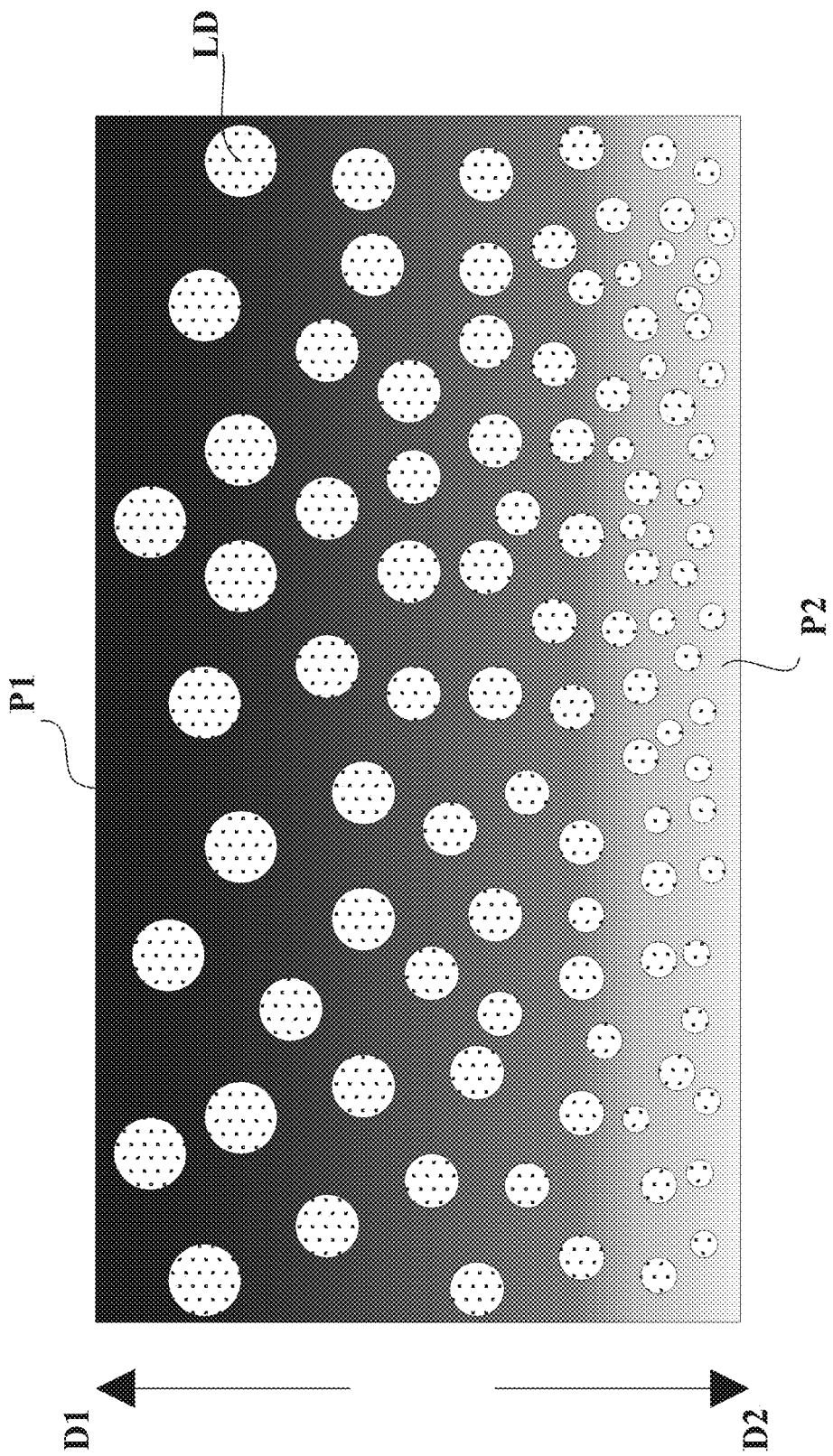
FIG. 11 is a schematic diagram illustrating a structure of an optical compensation film of a display apparatus in some embodiments according to the present disclosure.

In some embodiments, the at least one optical compensation film includes a plurality of liquid crystal droplets dispersed in a polymer material. FIG. 11 is a schematic diagram illustrating the structure of an optical compensation film of a display apparatus in some embodiments according to the present disclosure. Referring to FIG. 11, the at least one optical compensation film includes a plurality of liquid crystal droplets LS dispersed in a polymer material. As shown in FIG. 11 and FIG. 10, sizes of the plurality of liquid crystal droplets LS have a gradient distribution along a first direction D1 from the array substrate AS to the counter substrate CS or along a second direction D2 from the counter substrate CS to the array substrate AS. The polymer material includes a first polymer P1 and a second polymer P2. Optionally, contents of the first polymer P1 has a gradient distribution such that the content of the first polymer P1 increases along one of the first direction and the second direction (e.g., increases along the first direction D1), and decreases along another of the first direction and the second direction (e.g., decreases along the second direction D2). Optionally, contents of the second polymer P2 has a gradient distribution such that the content of the second polymer P2 increases along the another of the first direction and the second direction (e.g., increases along the second direction D2), and decreases along the one of the first direction and the second direction D2 (e.g., decreases along the first direction D1). Optionally, the sizes of the plurality of liquid crystal droplets increases along the one of the first direction and the second direction (e.g., increases along the first direction D1), and decreases along the another of the first direction and the second direction D2 (e.g., decreases along the second direction D2).

In some embodiments, the at least one optical compensation film may be formed by forming a mixture including a liquid crystal molecule, a first monomer, and a second monomer; and irradiating the mixture to polymerize the first monomer into a first polymer and polymerize the second monomer into a second polymer, so that the at least one optical compensation film comprises a plurality of liquid crystal droplets dispersed in a polymer material. Optionally, the mixture further includes an ultraviolet absorbing dye.

In some embodiments, the first polymer is an acrylate polymer and the second polymer is an epoxy polymer.

In some embodiments, the mixture further includes a photoinitiator. Optionally, the photoinitiator includes UVI-6976, which is a 50 wt % solution of triacrylsulfonium hexafluoroantimonate salts in propylene carbonate.

In some embodiments, the ultraviolet absorbing dye includes

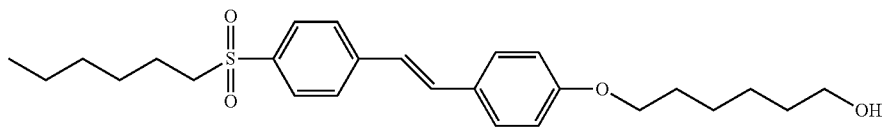 [SMILES: CCCCCCS(=O)(=O)c1ccc(/C=C/c2ccc(OCCCCCCO)cc2)cc1]

Optionally, the liquid crystal molecule includes SLC-1717 (Slichem Liquid Crystal Material In one example (Sample 1), the mixture includes 40.0 wt % of ethylene glycol diglycidyl ether (EGDE), 58.0 wt % SLC-1717, and 2.0 wt % of UVI-6976.

In another example (Sample 2), the mixture includes 32.0 wt % of trans-3-Methyl-2-hexenoic acid (TMHA), 8.0 wt % of 1,4-butanediol diacrylate, 59.0 wt % SLC-1717, and 1.0 wt % of 2,2-dimethoxy-2-phenyl acetophenone (Irgacure 651, Ciba, Switzerland).

In another example (Sample 3), the mixture includes 16.0 wt % of trans-3-Methyl-2-hexenoic acid (TMHA), 4.0 wt % of 1,4-butanediol diacrylate, 20.0 wt % of ethylene glycol diglycidyl ether (EGDE), 56.0 wt % SLC-1717, 1.0 wt % of 2,2-dimethoxy-2-phenyl acetophenone (Irgacure 651, Ciba, Switzerland), 2.0 wt % of UVI-6976, and 1.0 wt % of the ultraviolet absorbing dye.

Among these samples (Sample 1 to Sample 3), transmittance of an optical compensation film fabricated using Sample 3 is most sensitive to a voltage applied to the optical compensation film. All three samples have a relatively low transmittance for visible light having a wavelength in a range of 300 nm to 800 nm.

In some embodiments, when the mixture is irradiated using ultraviolet light, the first monomer (e.g., an acrylate monomer) polymerizes into a first polymer (e.g., an acrylate polymer), and the second monomer (e.g., an epoxy monomer) polymerizes into a second polymer (e.g., an epoxy polymer). In some embodiments, the first monomer has a greater polymerization rate as compared to the second monomer. In particular, when the mixture includes the ultraviolet absorption dye, the first monomer is polymerized faster on a side closer to the ultraviolet light source as compared to a side further away from the ultraviolet light source. As a result, the first monomer in the mixture migrates toward the side closer to the ultraviolet light source, the first monomer (as well as the first polymer) is enriched on the side closer to the ultraviolet light source, and the second monomer (as well as the second polymer) is enriched on the side further away from the ultraviolet light source. The first polymer forms a first network on the side closer to the ultraviolet light source, and the second polymer forms a second network on the side further away from the ultraviolet light source. In one example, the second monomer has a higher polymerization degree as compared to the first monomer. The second network is more dense than the first network, and the first network is more sparse than the second network. As a result, the sizes of the liquid crystal droplets in the second network are smaller than the sizes of the liquid crystal droplets in the first network, thereby forming a size gradient distribution along a direction from the side further away from the ultraviolet light source to the side closer to the ultraviolet light source.

In another aspect, the present disclosure provides a method of operating a display apparatus. In some embodiments, the liquid crystal layer in a dark state has a first phase retardation, which is a product of a refractive index of the liquid crystal layer and a cell gap corresponding to a thickness of the liquid crystal layer along a direction from the array substrate to the counter substrate. In some embodiments, the method includes, when the liquid crystal layer is in the dark state, applying a first voltage to the control electrode to control the at least one optical compensation film to give a second phase retardation, such that a sum of the first phase retardation and the second phase retardation is substantially same as an integral multiple of a wavelength of light emitted from the back light, thereby reducing dark state light leakage of the display apparatus. In some embodiments, the method includes, when the display apparatus is in an image display mode, applying a second voltage to the control electrode to control the at least one optical compensation film to reduce a contrast ratio and transmittance of the display apparatus in the image display mode, thereby achieving a reduced viewing angle. Optionally, the sum of the first phase retardation and the second phase retardation is substantially zero.

In some embodiments, the display apparatus further includes a reference electrode, the method further includes applying a low voltage to the reference electrode as a reference voltage for the control electrode. Optionally, a respective one of a plurality of subpixels of the display apparatus comprises a pixel electrode and a common electrode for applying an electric field for driving the liquid crystal layer. Optionally, applying the low voltage to the reference electrode includes applying a common voltage to the common electrode.

In some embodiments, the array substrate comprises a first glass layer subject to a first stress and having a third phase retardation; and the counter substrate comprises a second glass layer subject to a second stress and having a fourth phase retardation. Optionally, a sum of the first phase retardation, the second phase retardation, the third phase retardation, and the fourth phase retardation is substantially zero.

In another aspect, the present disclosure provides a method of fabricating a display apparatus. In some embodiments, the method includes forming an array substrate; forming a counter substrate; assembling the array substrate and the counter substrate into a cell; forming a liquid crystal layer in the cell between the array substrate and the counter substrate; forming at least one optical compensation film, the at least one optical compensation film formed between the array substrate and the counter substrate, extending throughout a display area of the display apparatus; forming a. control electrode, the control electrode formed between the array substrate and the counter substrate, and extending throughout the display area of the display apparatus; and forming a back light configured to provide light for image display. Optionally, the liquid crystal layer in a dark state has a first phase retardation, which is a product of a refractive index of the liquid crystal layer and a cell gap corresponding to a thickness of the liquid crystal layer along a direction from the array substrate to the counter substrate; under control of the control electrode, the at least one optical compensation film gives a second phase retardation when the liquid crystal layer is in the dark state; and a sum of the first phase retardation and the second phase retardation is substantially same as an integral multiple of a wavelength of light emitted from the back light, thereby reducing dark state light leakage of the display apparatus. Optionally, under control of the control electrode, the at least one optical compensation film is configured to reduce a contrast ratio and transmittance of the display apparatus in an image display mode, thereby achieving a reduced viewing angle.

In some embodiments, forming the at least one optical compensation film includes forming a mixture comprising a liquid crystal molecule, a first monomer, and a second monomer; and irradiating the mixture to polymerize the first monomer into a first polymer and polymerize the second monomer into a second polymer, thereby forming the at least one optical compensation film comprises a plurality of liquid crystal droplets dispersed in a polymer material. Optionally, the polymer material comprises the first polymer and the second polymer. Optionally, sizes of the plurality of liquid crystal droplets have a gradient distribution along a first direction from the array substrate to the counter substrate or along a second direction from the counter substrate to the array substrate. Optionally, contents of the first polymer has a gradient distribution such that the content of the first polymer increases along one of the first direction and the second direction, and decreases along another of the first direction and the second direction. Optionally, contents of the second polymer has a gradient distribution such that the content of the second polymer increases along the another of the first direction and the second direction, and decreases along the one of the first direction and the second direction. Optionally, the sizes of the plurality of liquid crystal droplets increases along the one of the first direction and the second direction, and decreases along the another of the first direction and the second direction.

Figure 12A:
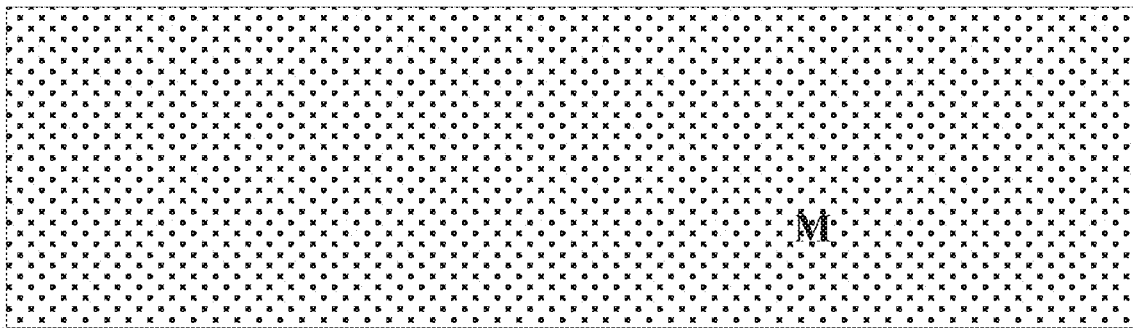
FIGS. 12A to 12C illustrate a method of fabricating an optical compensation film of a display apparatus in some embodiments according to the present disclosure.
Figure 12B:
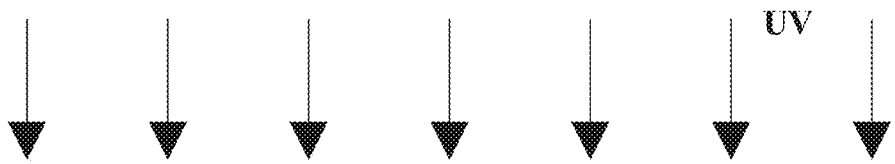
Figure 12B:
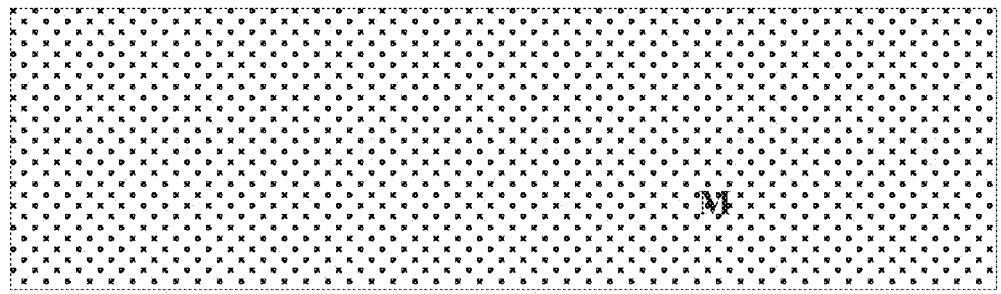
Figure 12C:
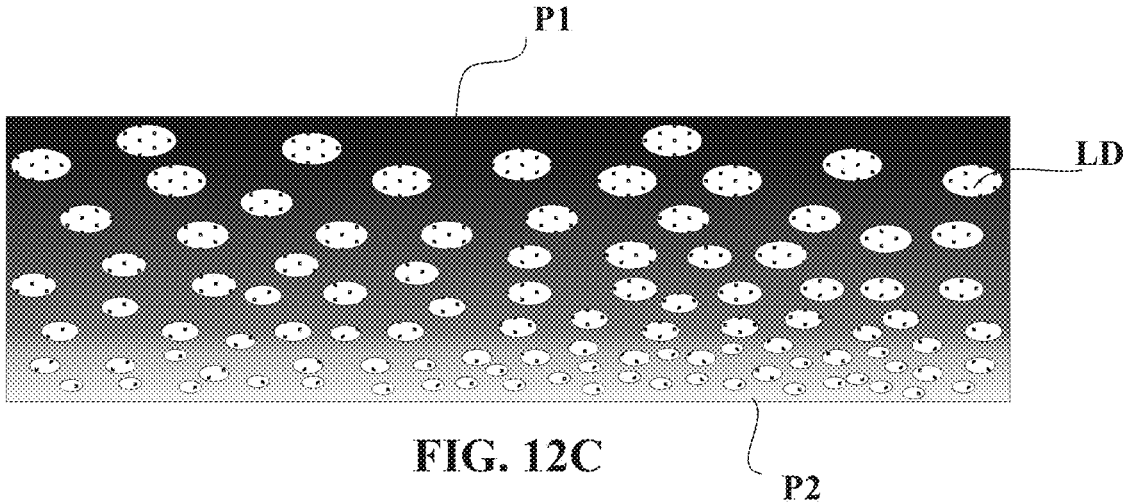

FIGS. 12A to 12C illustrate a method of fabricating an optical compensation film of a display apparatus in some embodiments according to the present disclosure. Referring to FIG. 12A, a mixture M including a first monomer, a second monomer, and a liquid crystal molecule is formed. Referring to FIG. 12B, the mixture M is irradiated using ultraviolet light UV. Referring to FIG. 12C, the first monomer is polymerized into a first polymer P1 having a first network that is more sparse, and the second monomer is polymerized into a second polymer P2 having a second network that is more dense. The liquid crystal droplets LD in the first network formed by the first polymer P1 has a greater size as compared to the liquid crystal droplets LD in the second network formed by the second polymer P2. The sizes of the liquid crystal droplets LD has a gradient distribution from the first network to the second network.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. it should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
an array substrate;
a counter substrate facing the array substrate;
a liquid crystal layer between the array substrate and the counter substrate;
at least one optical compensation film between the array substrate and the counter substrate, extending throughout a display area of the display apparatus;
a control electrode between the array substrate and the counter substrate, extending throughout the display area of the display apparatus; and
a back light configured to provide light for image display;
wherein the liquid crystal layer in a dark state has a first phase retardation, which is a product of a refractive index of the liquid crystal layer and a cell gap corresponding to a thickness of the liquid crystal layer along a direction from the array substrate to the counter substrate;
under control of the control electrode, the at least one optical compensation film gives a second phase retardation when the liquid crystal layer is in the dark state; and
a sum of the first phase retardation and the second phase retardation is substantially same as an integral multiple of a wavelength of light emitted from the back light, thereby reducing dark state light leakage of the display apparatus;
wherein, under control of the control electrode, the at least one optical compensation film is configured to reduce a contrast ratio and transmittance of the display apparatus in an image display mode, thereby achieving a reduced viewing angle;
wherein the array substrate comprises a first glass layer subject to a first stress and having a third phase retardation;
the counter substrate comprises a second glass layer subject to a second stress and having a fourth phase retardation; and
a sum of the first phase retardation, the second phase retardation, the third phase retardation, and the fourth phase retardation is substantially zero.

2. The display apparatus of claim 1, wherein the sum of the first phase retardation and the second phase retardation is substantially zero.

3. The display apparatus of claim 1, further comprising a first alignment film between the liquid crystal layer and the array substrate and a second alignment film between the liquid crystal layer and the counter substrate, for aligning liquid crystal molecules in the liquid crystal layer;
wherein the control electrode is a unitary layer between the counter substrate and the second alignment film.

4. The display apparatus of claim 3, wherein the at least one optical compensation film is between the control electrode and the second alignment film.

5. The display apparatus of claim 3, wherein the at least one optical compensation film is between the array substrate and the first alignment film.

6. The display apparatus of claim 3, wherein the at least one optical compensation film comprises a first optical compensation film between the control electrode and the second alignment film, and a second optical compensation film between the array substrate and the first alignment film.

7. The display apparatus of claim 1, further comprising a reference electrode configured to provide a low voltage as a reference voltage for the control electrode.

8. The display apparatus of claim 7, wherein a respective one of a plurality of subpixels of the display apparatus comprises a pixel electrode and a common electrode for applying an electric field for driving the liquid crystal layer;
wherein the common electrode functions as the reference electrode.

9. The display apparatus of claim 1, further comprising a first polarization plate and a second polarization plate;
wherein the first glass layer is between the first polarization plate and the liquid crystal layer; and
the second glass layer is between the second polarization plate and the liquid crystal layer.

10. The display apparatus of claim 1, wherein the control electrode comprises a plurality of control electrode blocks respectively in a plurality of subpixels of the display apparatus; and
the plurality of control electrode blocks are independently addressable.

11. The display apparatus of claim 1, wherein the at least one optical compensation film comprises a plurality of liquid crystal droplets dispersed in a polymer material;
sizes of the plurality of liquid crystal droplets have a gradient distribution along a first direction from the array substrate to the counter substrate or along a second direction from the counter substrate to the array substrate.

12. The display apparatus of claim 11, wherein the polymer material comprises a first polymer and a second polymer;
a content of the first polymer has a gradient distribution such that the content of the first polymer increases along one of the first direction and the second direction, and decreases along another of the first direction and the second direction;
a content of the second polymer has a gradient distribution such that the content of the second polymer increases along the another of the first direction and the second direction, and decreases along the one of the first direction and the second direction; and
the sizes of the plurality of liquid crystal droplets increase along the one of the first direction and the second direction, and decreases along the another of the first direction and the second direction.

13. A method for operating a display apparatus, wherein the display apparatus comprises:
- an array substrate;
- a counter substrate facing the array substrate;
- a liquid crystal layer between the array substrate and the counter substrate;
- at least one optical compensation film between the array substrate and the counter substrate, extending throughout a display area of the display apparatus;
- a control electrode between the array substrate and the counter substrate, extending throughout the display area of the display apparatus; and
- a back light configured to provide light for image display;
- wherein the liquid crystal layer in a dark state has a first phase retardation, which is a product of a refractive index of the liquid crystal layer and a cell gap corresponding to a thickness of the liquid crystal layer along a direction from the array substrate to the counter substrate;
- wherein the method comprises:
- when the liquid crystal layer is in the dark state, applying a first voltage to the control electrode to control the at least one optical compensation film to give a second phase retardation, such that a sum of the first phase retardation and the second phase retardation is substantially same as an integral multiple of a wavelength of light emitted from the back light, thereby reducing dark state light leakage of the display apparatus; and
- when the display apparatus is in an image display mode, applying a second voltage to the control electrode to control the at least one optical compensation film to reduce a contrast ratio and transmittance of the display apparatus in the image display mode, thereby achieving a reduced viewing angle;
- wherein the array substrate comprises a first glass layer subject to a first stress and having a third phase retardation;
- the counter substrate comprises a second glass layer subject to a second stress and having a fourth phase retardation; and
- a sum of the first phase retardation, the second phase retardation, the third phase retardation, and the fourth phase retardation is substantially zero.

14. The method of claim 13, wherein the sum of the first phase retardation and the second phase retardation is substantially zero.

15. The method of claim 13, wherein the display apparatus further comprises a reference electrode;
- wherein the method further comprises applying a low voltage to the reference electrode as a reference voltage for the control electrode.

16. The method of claim 15, wherein a respective one of a plurality of subpixels of the display apparatus comprises a pixel electrode and a common electrode for applying an electric field for driving the liquid crystal layer;
- wherein applying the low voltage to the reference electrode comprises applying a common voltage to the common electrode.

17. A method for fabricating a display apparatus, comprising:
- forming an array substrate;
- forming a counter substrate;
- assembling the array substrate and the counter substrate into a cell;
- forming a liquid crystal layer in the cell between the array substrate and the counter substrate;
- forming at least one optical compensation film, the at least one optical compensation film formed between the array substrate and the counter substrate, extending throughout a display area of the display apparatus;
- forming a control electrode, the control electrode formed between the array substrate and the counter substrate, and extending throughout the display area of the display apparatus; and
- forming a back light configured to provide light for image display;
- wherein the liquid crystal layer in a dark state has a first phase retardation, which is a product of a refractive index of the liquid crystal layer and a cell gap corresponding to a thickness of the liquid crystal layer along a direction from the array substrate to the counter substrate;
- under control of the control electrode, the at least one optical compensation film gives a second phase retardation when the liquid crystal layer is in the dark state; and
- a sum of the first phase retardation and the second phase retardation is substantially same as an integral multiple of a wavelength of light emitted from the back light, thereby reducing dark state light leakage of the display apparatus;
- wherein, under control of the control electrode, the at least one optical compensation film is configured to reduce a contrast ratio and transmittance of the display apparatus in an image display mode, thereby achieving a reduced viewing angle;
- wherein forming the at least one optical compensation film comprises:
- forming a mixture comprising a liquid crystal molecule, a first monomer, and a second monomer; and
- irradiating the mixture to polymerize the first monomer into a first polymer and polymerize the second monomer into a second polymer, so that the at least one optical compensation film comprises a plurality of liquid crystal droplets dispersed in a polymer material:
- wherein the polymer material comprises the first polymer and the second polymer;
- sizes of the plurality of liquid crystal droplets have a gradient distribution along a first direction from the array substrate to the counter substrate or along a second direction from the counter substrate to the array substrate;
- a content of the first polymer has a gradient distribution such that the content of the first polymer increases along one of the first direction and the second direction, and decreases along another of the first direction and the second direction;
- a content of the second polymer has a gradient distribution such that the content of the second polymer increases along the another of the first direction and the second direction, and decreases along the one of the first direction and the second direction; and
- the sizes of the plurality of liquid crystal droplets increase along the one of the first direction and the second direction, and decreases along the another of the first direction and the second direction.

* * * * *